Jan. 10, 1967   D. H. NEWHALL   3,296,855
PRESSURE CYLINDER TYPE MEASURING APPARATUS
Filed Sept. 11, 1964   2 Sheets-Sheet 1

INVENTOR.
Donald H. Newhall
BY
Maxwell Fish
ATTORNEY

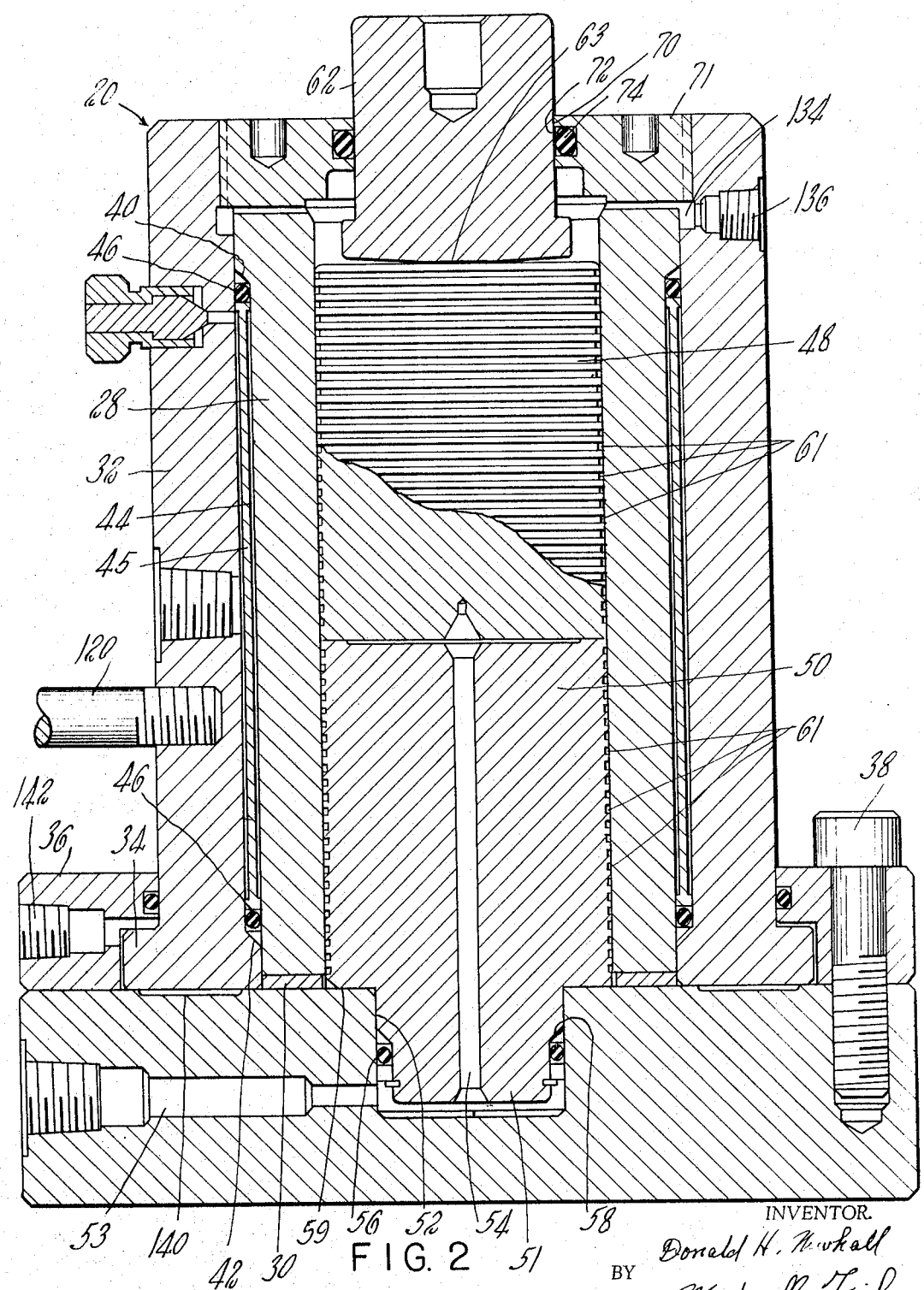

United States Patent Office 3,296,855
Patented Jan. 10, 1967

3,296,855
PRESSURE CYLINDER TYPE MEASURING
APPARATUS
Donald H. Newhall, Walpole, Mass., assignor to Harwood
Engineering Company, Walpole, Mass., a corporation
of Massachusetts
Filed Sept. 11, 1964, Ser. No. 395,859
7 Claims. (Cl. 73—141)

The present invention relates to a load cell adapted for measuring accurately very substantial forces.

The load cell here shown comprises generally a pressure cylinder unit having a piston which is acted upon in one direction by the force or weight to be measured, and which is acted upon in the opposite direction by a balancing pressure which is accurately determined and which when multiplied by the area over which the pressure is exerted gives an accurate determination of the specimen force or weight.

The pressure cylinder unit employed is of the same general type shown in my prior Patent No. 2,796,229, having as a salient feature thereof a fluid pressure jacketed cylinder adapted for controlling the internal diameter of the cylinder and thus the amount of clearance to be maintained between the cylinder wall and the piston which will ensure a freely sliding fit without at the same time permitting an excess of the hydraulic medium to escape past the piston.

It is a principal object of the invention to provide a novel and improved load cell of the general type described which is capable of extremely accurate and dependable measurements over a range of from few to several million pounds.

It is a further object of the invention to provide a load cell having a pressure cylinder of the general type referred to jacketed for the application of fluid pressure to control the internal diameter piston clearance when subjected to very high pressures, which is particularly constructed and arranged to permit of a very substantial increase in piston diameter with a corresponding increase of force resulting from pressure acting over the larger area without sacrifice of the friction free sliding characteristic of the piston necessary for accurate measurements of forces which may be in the order of several million pounds.

With the above and other objects in view as may hereinafter appear the several features of the invention consist in the devices, combinations and arrangements of parts hereinafter described and claimed which, together with the advantages to be obtained thereby, will be readily understood by one skilled in the art from the following description taken in connection with the accompanying drawings, in which:

FIG. 2 is a vertical section along the axis of the load cell shown in FIG. 1, but on a full scale;

Figure 1:
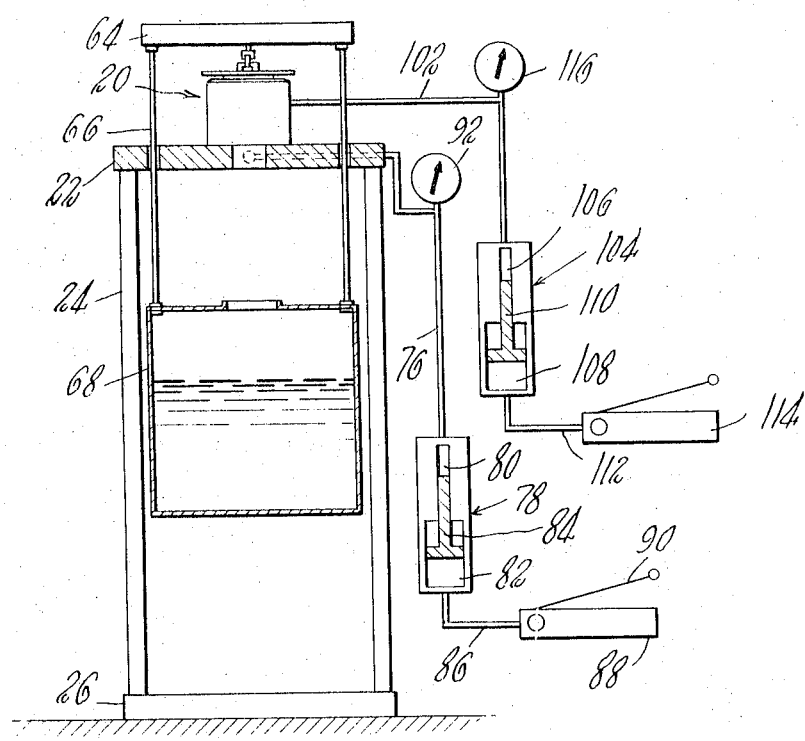
FIG. 1 is a somewhat diagrammatic small scale view of my load cell adapted for the weighing of very heavy objects as, for example, a tank containing a liquid medium.

The load cell herein disclosed as embodying in a preferred form the several features of the invention comprises a pressure cylinder unit designated generally at 20 mounted on a platform 22 which is in turn supported by means of uprights 24 on a base 26. The pressure cylinder unit referred to, as shown in FIG. 2, comprises an inner cylinder 28 supported in vertical position on the platform 22 and adapted to be rotated thereon on an annular bushing 30, and an outer jacketing cylinder 32 fitted thereto having an outwardly flanged lower end portion 34 over which is fitted an annular supporting ring 36 rigidly secured to the platform 22 by bolts 38. The outer periphery of the inner cylinder 28 is formed toward its upper end with a portion of enlarged diameter and an outwardly sloping shoulder 40. The inner periphery of the lower end of the jacketing cylinder 32 is similarly provided toward its lower end with an inwardly sloping shoulder 42 and an end portion of smaller diameter so that an annular cavity 44 is formed between the two sleeves. It will be noted that a cylindrical steel filler 45 is mounted within and substantially reduces the available volume of the cavity 44. Suitable packings 46 are provided at each end of the cavity 44 to prevent escape of the fluid under pressure therefrom.

A piston 48 having squared off upper and lower ends is slidably mounted within the inner cylinder 28, and is arranged to be supported at its lower end against a relatively stationary plug 50 also having a sliding fit with the inner wall of the cylinder 28. A reduced lower end 51 of the plug 50 is fitted into a cylindrical aperture 52 formed in the platform 22. Fluid under pressure is introduced through an inlet port 53 to the lower end of the aperture 52, and passes upwardly through a radial bore 54 in the plug 50 into a space existing between the upper end of the stationary plug 50 and the lower end of the piston 48. Said fluid under pressure is prevented from moving upwardly around the outer edges of the stationary plug 50 from the bottom thereof by means of suitable packings 56 introduced between a shoulder 58 formed in the reduced lower end portion 51 of the plug and its supporting aperture 52. With this arrangement the area subjected to fluid pressure at the upper end of the plug 50 is substantially larger than the area subjected to such pressure at the lower end of the plug so that the plug is forced downwardly, and a transverse surface 59 thereof between the large and reduced portions of the plug is firmly seated against the top surface of the platform 22. It will be noted that the peripheral surface of the piston 48, and also the peripheral surface of the plug 50 are formed with a series of separated circumferential grooves 61. Said grooves provide individual reservoirs for lubricant which is thus distributed freely around the circumference of the piston and plug and tend to support them in a central and balanced position which will ensure adequate lubrication entirely around the periphery of the cylinder.

The load cell is loaded with a weight to be measured in the following manner. A load coupler 62, which takes the form of a plug having the bottom face thereof formed with a small central flat 63 and with adjacent slightly relieved bottom surfaces for engagement against the top face of the piston 48. For purposes of illustration the load coupler is shown as supporting a tank 68 containing a liquid medium the weight of which is to be measured by means of a cross arm 64 and depending links 66. It will be noted that the load coupler 62 extends upwardly through a cylindrical aperture 70 formed in the cover 71 of the pressure cylinder which is sized to provide a loose fit between the cover 71 and the load coupler 62. A groove 72 formed in the peripheral face of the aperture provides support for a rubber ring 74 which bears against the wall of the load coupler 62 and tends to maintain the coupler in an exactly centered position with relation to the piston 48.

The hydraulic system for supplying a fluid medium at a loading pressure to the pressure cylinder unit of the load cell, as best shown in FIGS. 1 and 2 comprises the inlet port 53 through which fluid pressure is directed into the lower end of the pressure cylinder unit above described. The inlet port 53 is connected with an intensifier 78 shown in somewhat diagrammatic form comprising a casing with bores 80 and 82 of two different diameters, and a differential piston 84 having the ends thereof fitted into the respective bores. The bore 82 of the intensifier is connected by means of a pipe 86 with a hand pump 88 which may be of ordinary description including a manually operable handle 90 which acts when pumped to force increments of fluid pressure through the pipe 86, intensifier 78, pipe 76 and inlet port 53 to the pressure cylinder unit of the load cell. The pressure gage 92 in the pipe 86 provides a direct reading of the fluid loading pressure directed against the bottom end end of the piston 48. As shown in FIG. 1 the load cell testing apparatus is set up to measure the weight of the tank 68 and liquid contained therein.

Fluid under pressure is supplied to the cavity 44 for controlling the internal diameter of the cylinder 28 through connections which include a radial pressure inlet conduit 98 through the jacket cylinder 32 and a pipe 102 which is connected with an intensifier 104 comprising a casing formed of two different sized bores 106, 108 and a differential piston 110 with the two ends thereof fitted into said bores. The larger bore 108 of the intensifier is connected by a pipe 112 with a manually operable pump 114 from which increments of the control pressure medium are forced into the circumferential conduit or aperture 44 as needed. A pressure gage 116 tapped into the pipe 112 provides to the operator a direct indication of the value of the control pressure.

Figure 3:
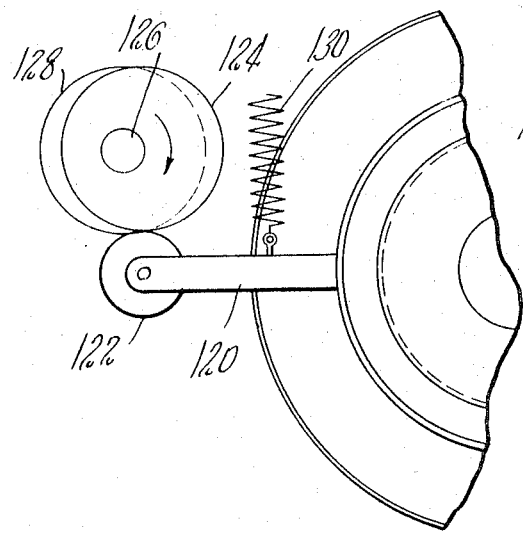
FIG. 3 is a fragmentary top plan view of the load cell shown in FIG. 2.
Figure 4:
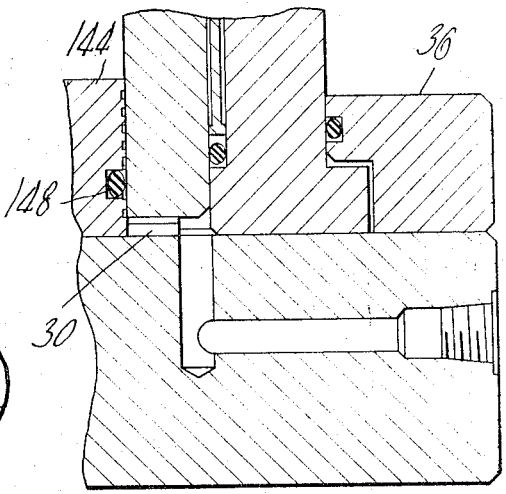
FIG. 4 is a fragmentary view of parts as shown in FIG. 2, but modified so that the plug operates as a closure nonrotatably connected with the pressure cylinder.

A feature of the invention consists in the construction and arrangement of the pressure cylinder assembly which permits a rotary oscillatory or vibratory movement to be imparted to the cylinder sleeve assembly while the load cell is in use to free the piston of any tendency to stick to the interior wall of the cylinder 28 and thus to ensure a free floating relationship between the piston and cylinder assembly. As shown in FIGS. 2 and 3, a post 120 screw threaded radially into the outer jacketing cylinder 32 is provided at its outer end with a cam follower disc 122 which is engaged by a cam 124 carried on the armature shaft 126 of an electric motor diagrammatically indicated at 128. A tension spring 130 connected to the post 120 acts to bias the cylinder assembly and post 120 clockwise as shown in FIG. 3 to maintain the follower 122 in engagement with the cam. It will be understood that the contour of the cam 124 and rate of rotation of the armature shaft 126 may be regulated to produce either an oscillatory movement of substantial extent, or alternatively a rapid vibratory movement of very small extent as may be desired. As will hereinafter appear in the description of the operation of the device it is contemplated that a rather substantial oscillatory movement may be imparted to the sleeve assembly as shown in FIGS. 1, 2 and 3, whereas a very small vibratory movement up to and including ultrasonic frequencies would be preferred for use with the modified construction as shown in FIG. 4. It will be understood that such vibratory movement may be effected by inducing such vibration either in the cylinder or the piston.

The operation of my improved load cell as shown in FIGS. 1, 2 and 3 will be briefly described as follows:

It is assumed that a measurement is to be made of the weight of the liquid in tank 68. Fluid under pressure is pumped through intensifier 78 through inlet port 53 and central bore 54 in the plug 50 into the space provided between the plug 50 and the lower end of the piston 48. As the amount of this pressure is increased, fluid under pressure is pumped also through the intensifier 104, pipe 102 and inlet port 98 to the circumferential cavity 44 to offset and to control any tendency of the internally applied pressure to expand the internal diameter of the inner cylinder 28. Further to avoid any tendency of the piston 48 to stick to the wall of the inner cylinder 28, the electric motor 128 is driven so that an oscillatory movement is imparted to the cylinder assembly comprising the inner cylinder 28 and jacketing cylinder 32 by the cam 124 acting against the spring biased post 120 and follower 122. The pressure of the fluid medium applied against the underside of the piston 48 is increased until the force exerted (pressure times area of the piston) is equal to and offsets the weight of the liquid filled tank 68. The pressure supplied from the intensifier 106 to the cavity 44 is increased to the point at which a close sliding fit is provided between the piston 48 and inner cylinder wall, a sufficient clearance only being allowed for lubrication and for a sliding fit between the piston and inner cylinder. Any leakage of lubricant past the piston is drawn off through an annular conduit 134 and outlet port 136. In order to prevent any tendency of the piston 48 to tilt slightly within the supporting cylinder 28 with the resultant bind against the cylinder wall, the load acting against the upper end of the cylinder is very carefully centered by means of the load coupler 62 centrally located as above noted by means of a rubber ring 74, and having the rockered bottom face thereof centered against the flat top surface of the piston 48. A free movement of the piston 48 with relation to the supporting cylinder 28 is further assisted by the annular lubrication grooves 61 in the periphery of the piston 48, which perform, in addition to the usual function of aiding lubrication, the additional function of accurately centering the piston 48 in the cylinder with relation to the heavily weighted load connector 62. These grooves cause the fluid to be distributed evenly about the periphery of the cylinder, providing a cushion of said lubricant to prevent tilting of the cylinder. The individual grooves serve to prevent any build up of unbalanced transverse forces between the piston and the adjacent inner surface of the cylinder 28 which might cause sticking or freezing of the piston to the supporting cylinder wall.

The plug 50 plays an important part in the operation above described in that a free sliding fit is established also between the periphery of the plug 50 and the internal surface of the inner cylinder 28. The lubrication of the closely fitted surfaces of the plug 50 and cylinder 28 is effected by leakage of the high pressure fluid between the piston and plug. The adjustments above described which have produced a free sliding fit between the piston 48 and inner cylinder 28 have the effect of providing a similar free sliding fit between the plug 50 and cylinder 28 which is thus made freely rotatable relative to both the piston 48 and plug 50. Any excess fluid which leaks past the plug 50 is forced between the bushing 30 and the lower end of the cylinder 28 outwardly into an annular recess 140 formed in the upper face of the platform 22 under the lower end of the outer cylinder 32, and is drawn off through an outlet port 142 formed in the annular ring 36. With the arrangement above described the cylinder assembly, comprising cylinder 28 and jacketing cylinder 32 driven by motor 128 and cam 124, is permitted to oscillate freely with relation to the plug 50 and piston 48 which are frictionally engaged respectively against the platform 22 and load coupler 62.

FIG. 4 illustrates a modified form of my load cell in which the plug 50 has been replaced by a similar but somewhat shorter plug 144 having formed in the periphery thereof an annular groove 146 into which is fitted a rubber ring 148 which acts as a lubricant seal. So constructed, the plug 144 acts as a closure for the lower end of the pressure cylinder 20. Substantial frictional forces are set up between the plug 144 and the supporting platform 22, and between the plug 144 and sleeve 28 which effectively lock the sleeves 28 and 32 against rotational movement when pressure is applied. With this construction it has been found, however, that a vibratory movement applied tangentially to the periphery of the outer cylinder 32 of the assembly acts very strongly to overcome any tendency of the piston 48 to stick to the walls of the inner cylinder 28, even though no perceptible relative rotational movement takes place between the platform 22, plug 144 and inner cylinder 28.

The invention having been described what is claimed is:

1. For use in a pressure cylinder type measuring apparatus for balancing fluid pressure against an externally applied force, the combination of a base, a metallic cylinder supported on said base to rotate on a vertical axis, a piston disposed within and having a leakage fit clearance with the cylinder for movement relative thereto, a plug disposed within the cylinder below the piston having a leakage fit clearance with the cylinder and forming with the base a bottom closure for the cylinder, means for supplying fluid under pressure into said cylinder between the piston and plug for balancing said piston against said external force, a fluid pressure measuring device connected with said fluid pressure supply means, jacketing means providing a pressure fluid cavity extending circumferentially about said cylinder, and means for applying fluid at control pressures within said cavity for contracting said cylinder radially within the limits of elasticity to maintain said leakage fit clearance between the cylinder and each of said piston and plug.

2. For use in a pressure cylinder type measuring apparatus for balancing fluid pressure against an externally applied force, the combination of a base, a metallic cylinder supported on said base to rotate relatively thereto on a vertical axis, said base forming a bottom closure for said cylinder, a piston disposed within and having a leakage fit clearance with the cylinder for movement relative thereto, the upper end of said piston being constructed and arranged to be acted upon by an external force, a plug disposed within the cylinder below the piston having a leakage fit clearance with the cylinder and differential pressure faces including a large pressure face adjacent said piston and a smaller pressure face toward said base, means for supplying fluid under pressure into said cylinder between the piston and plug and between the plug and said base for maintaining said plug against the base and for balancing said piston against a weight to be measured, a fluid pressure measuring device connected with said fluid pressure supply means, jacketing means providing a pressure fluid cavity extending circumferentially about said cylinder, and means for supplying fluid at control pressures within said cavity for contracting said cylinder radially within the limits of elasticity to maintain said leakage fit clearance between the cylinder and each of said piston and plug for free movement of said piston axially and of said cylinder rotational relative to said piston.

3. A pressure cylinder type measuring apparatus according to claim 2 in which an operating device is connected with said cylinder for imparting rotational movement thereto relative to said piston and plug.

4. A pressure cylinder type measuring apparatus according to claim 2 in which a vibratory device is connected with said cylinder for imparting a vibratory motion to said cylinder tangentially.

5. A pressure cylinder type measuring apparatus according to claim 2 in which a seal is provided between the plug and the cylinder so that the plug provides a complete fluid pressure bottom closure for said cylinder.

6. A pressure cylinder type measuring apparatus according to claim 2 in which the piston is formed with a flat top surface, and a load coupler is provided having a small central flat and adjacent relieved bottom surface axially engaging said piston flat top surface.

7. A pressure cylinder type measuring apparatus according to claim 2 in which each of said piston and plug have formed in the peripheries thereof a series of annular lubricant retaining grooves.

References Cited by the Examiner

UNITED STATES PATENTS

| 2,380,362 | 7/1945 | Hem | 73—141 |
| 2,386,989 | 10/1945 | Summers | 73—97 |
| 2,796,229 | 6/1957 | Newhall | 73—88 X |

RICHARD C. QUEISSER, *Primary Examiner.*

C. A. RUEHL, *Assistant Examiner.*